United States Patent [19]

Rees

[11] 3,767,352
[45] Oct. 23, 1973

[54] INJECTION MOLD WITH UNLOADING MECHANISM

[75] Inventor: Herbert Rees, Toronto, Ontario, Canada

[73] Assignee: Husky Manufacturing & Tool Works Limited, Bolton, Ontario, Canada

[22] Filed: July 12, 1971

[21] Appl. No.: 161,845

[52] U.S. Cl. ................................. 425/441, 425/444
[51] Int. Cl. ................................................ B29f 1/14
[58] Field of Search .................... 425/422, 436, 438, 425/441, 444; 249/66, 67, 68

[56] References Cited
UNITED STATES PATENTS

| 2,272,718 | 2/1942 | MacLagan et al. ............ 249/68 X |
| 3,359,598 | 12/1967 | Bucy ................................ 425/153 |
| 3,268,952 | 8/1966 | Shelby ............................. 425/397 |
| 3,491,826 | 1/1970 | Potts ............................. 425/422 X |

Primary Examiner—J. Spencer Overholser
Assistant Examiner—David S. Safran
Attorney—Karl F. Ross

[57] ABSTRACT

Two pairs of lever arms, fulcrumed on one of two relatively movable mold portions, form part of an articulated linkage anchored to the other mold portion and connected with either a stripper plate between the two mold portions or an ejector plate behind the second mold portion. Upon the opening of the mold, the stripper or ejector plate moves relatively to the adjacent mold portion, in a direction discharging the molded articles from the mold cavities, at a rate substantially conforming to a Gaussian curve. The linkage may include a lost-motion coupling to hold the plate in an inoperative position during a terminal phase of a closure stroke.

13 Claims, 9 Drawing Figures

INJECTION MOLD WITH UNLOADING MECHANISM

My present invention relates to a mechanism for unloading one or more mold cavities of an injection-molding machine, i.e., for discharging the molded articles from these cavities after the mold is opened.

Generally, such unloading operations can be carried out with the aid of either a stripper plate, interposed between the two relatively movable mold portions defining the cavity or cavities, or a set of ejector pins (at least one per cavity) which traverse one of the mold portions and may be interconnected beyond the latter by a common plate or the like.

In my copending application Ser. No. 115,207, filed Feb. 16, 1971, I have disclosed a mechanism of the second type wherein an articulated linkage on a movable platen, carrying one of the halves of a split mold, connects this platen with an ejector plate in such a manner that the plate performs a harmonic unloading motion, progressively accelerating from standstill, whenever a pusher member coupled with that linkage strikes a fixed abutment during the terminal phase of a mold-opening stroke.

The general object of my present invention is to provide an unloading mechanism which imparts a similar harmonic motion to one or more discharging elements but which does not require the mounting of an extended linkage, occupying considerable space, externally of the mold and its supporting platens.

Another object is to provide a mechanism of this description adapted to operate either an externally positioned ejector plate or a stripper plate sandwiched between the relatively movable mold portions.

A further object is to provide an unloading mechanism effective with a dual mold, i.e., with a combination of three relatively movable mold portions together defining two sets of cavities, this mechanism coordinating the displacement of the several mold portions with reference to one another as well as to the unloading means.

In accordance with the present invention, I also utilize an articulated linkage which, however, is joined to the relatively movable old portions (either directly or through their supporting platens) to actuate the unloading means in response to a displacement of these mold portions into the open-mold position; in the closed-mold position the linkage keeps the unloading means retracted.

According to a more specific feature of my invention, the linkage includes an elongate member which extends generally diagonally between a first mold portion, provided with the unloading means, and a confronting second mold portion, this member being pivoted to that second mold portion as well as to a shorter swingable arm fulcrumed on that first mold portion. The swingable arm may be designed as a bell-crank lever coupled, via a pivoted extension thereof, with the axially movable stripper or ejector plate forming part of the unloading means; with two relatively reversed linkages symmetrically disposed on opposite sides of the mold, this plate is then supported at diametrically opposite locations. Alternatively, the elongate member can be fulcrumed on the first mold portion, i.e., the one carrying the stripper plate, in which event a camming formation on that member effects the operative displacement of that plate when the mold opens.

With the use of such a linkage, the rate of motion of the stripper or ejector plate follows substantially a Gaussian curve generally equivalent to a low of simple harmonic motion. In order to delay the start of the plate movement upon incipient opening of the mold, I may include in the linkage a lost-motion coupling together with spring means biasing that coupling in a sense to urge the plate into its retracted position during the terminal phase of the mold-closing stroke.

The above and other features of my invention will be described in greater detail hereinafter with reference to the accompanying drawing in which.

Figure 1:
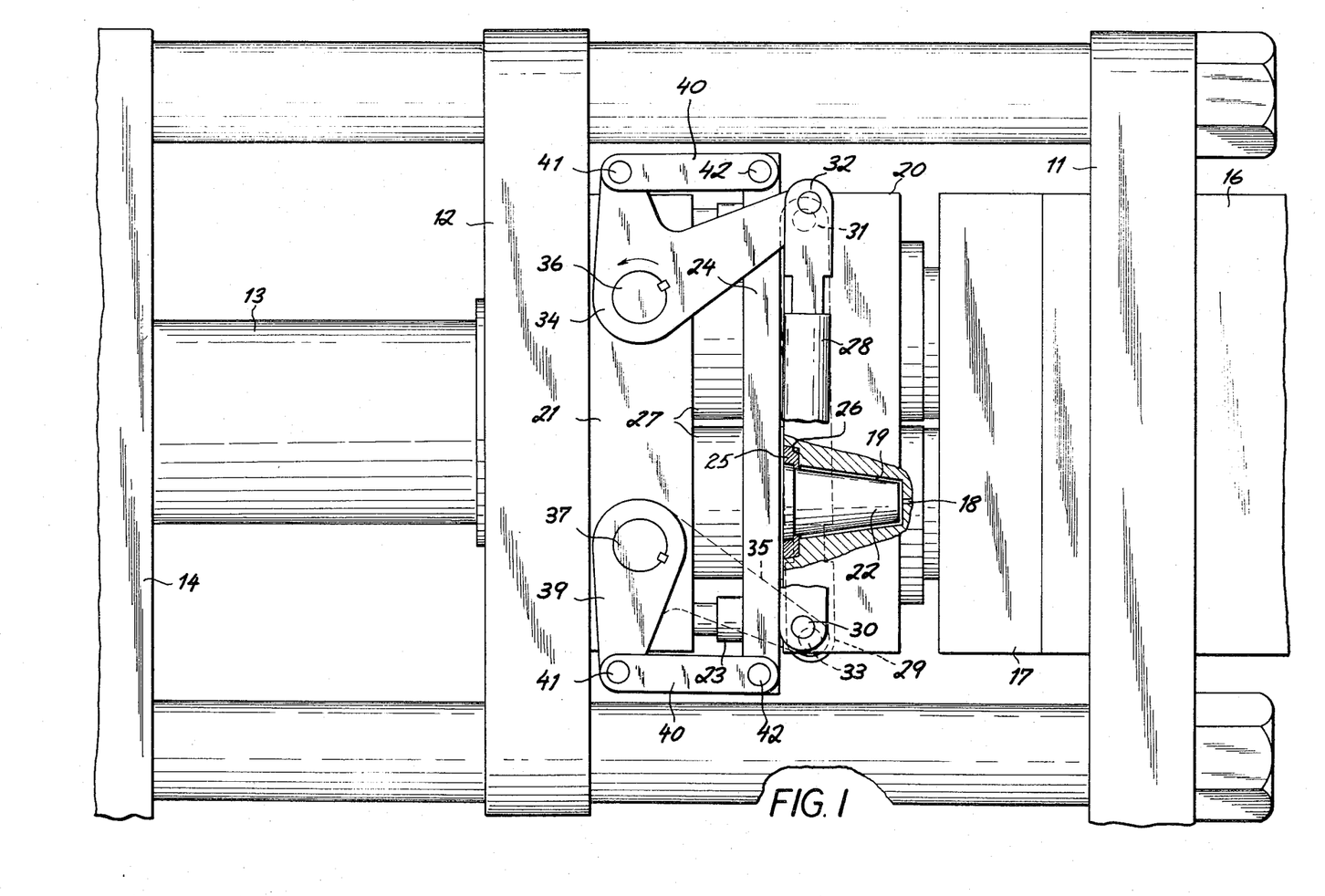
FIG. 1 is a side-elevational view, partly in section, of a portion of an otherwise conventional injection-molding machine incorporating my improved unloading mechanism, shown in a position of mold closure.
Figure 2:
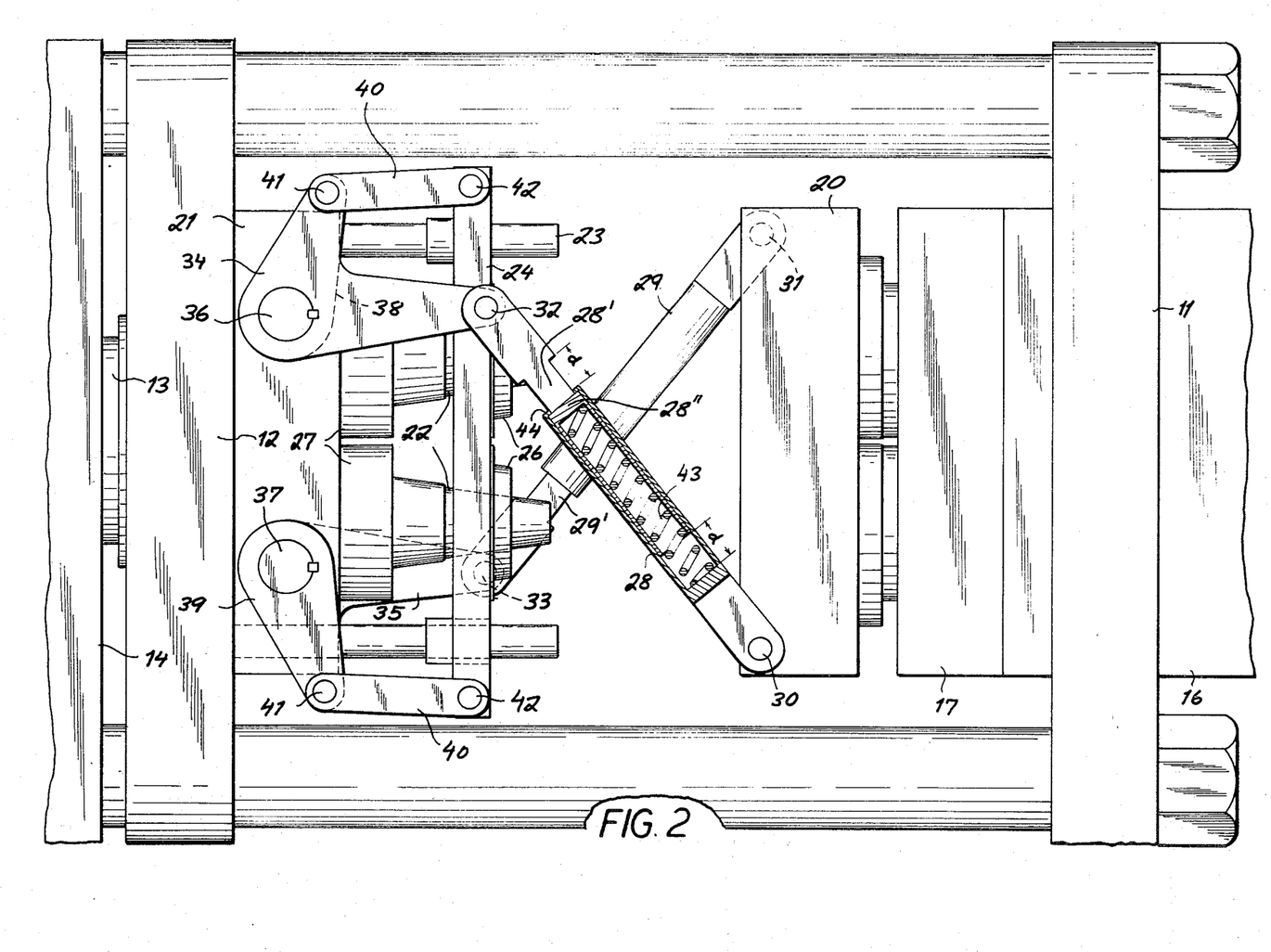
FIG. 2 is a view similar to FIG. 1 but showing the mechanism with the mold open.

An injection-molding machine according to the invention, partly illustrated in FIGS. 1 and 2, comprises a fixed platen 11 rising from a horizontal bed (not shown) and a movable platen 12 slidable, under the control of a reciprocating ram 13 guided in the machine frame 14, on a set of four tie bars 15 extending between the frame part 14 and the platen 11. The two platens may be of rectangular (i.e., square) configuration, with the tie bars disposed near the four corners thereof.

Platen 11 is rigid with the end of a cylinder 16 wherein an injection piston, not shown, is reciprocable in timed relationship with the ram 13 to inject liquefied plastic material through a distributor 17 and orifices 18 (only one shown) into a corresponding number of recesses 19 in a stationary mold portion 20 mounted on platen 11. A movable mold portion 21 carries a set of cores 22 fitting into respective recesses 19 to define therewith a number of mold cavities designed, in this specific embodiment, for the molding of drinking cups. Mold half 21 is secured to platen 12 for displacement toward and away from mold half 20.

A set of, say, four guide pins 23 support a stripper plate 24 which extends at right angles to the mold axis, between the mold halves 20 and 21, and is limitedly axially slidable with reference to mold half 21, plate 24 being apertured for the passage of mold cores 22 and carrying a set of rings 25 receivable in rabbets 26 of mold half 20 when the mold is closed as shown in FIG. 1. In this position the rings 25 define the left-hand boundaries of the cavities 19 at the mouth end of the cups to be molded therein; plate 24 rests against bases 27 of mold cores 22.

A pair of elongate members 28, 29, fulcrumed at 30, 31 to opposite sides of stationary mold half 20, have their free ends articulated at 32, 33 to a pair of bellcrank levers or elbows 34, 35, respectively; these levers, whose arms are substantially shorter than members 28 and 29, are keyed respective shafts 36, 37 passing transversely through movable mold half 21. The opposite ends of shafts 36 and 27 are keyed to respective arms 38, 39 which parallel the shorter arms of levers 34, 35 and, like the latter, lie generally parallel to plate 24 in the closed-mold position of FIG. 1. Straps 40, linked at 41 to these shorter lever arms and to the arms 38, 39, are pivoted at 42 to the stripper plate 24 near the four corners thereof.

Members 28, 29 are part of a lost-motion connection designed to delay the swing of levers 34, 35, from their position of FIG. 1 in which the stripper plate 24 is retracted onto mold portion 21, until the two mold portions 20, 21 have partly separated on their way to the mold-open position of FIG. 2. Thus, each member 28, 29 is designed as a tube receiving a plunger 28', 29' which is pressed by a coil spring 43 against a stop 44 formed by an inturned lip at the free end of tube 28, 29. The distance $d$ in FIG. 2 represents the play allowed between members 28 and 28'; in the position of FIG. 1, member 28' is more deeply inserted into member 28 so that its head 28'' is spaced from lip 44 and is under pressure of spring 43 which is communicated through bell-crank lever 34 (as indicated by the arrow in FIG. 1) to strap 40 and thence to stripper plate 24. Upon incipient outward movement of platen 12, the slack between shoulder 44 and head 28'' is taken up with no substantial diminution of spring pressure until the two members 28, 28' are positively interengaged to swing the assembly 34, 36, 38 clockwise and to drive the plate 24 away from mold half 21, thereby stripping the molded articles from the cores 22.

Even without this lost-motion coupling, the start of the swing of levers 34 and 35 is at first imperceptible as the platen 12 moves to the left from its dead-center position of FIG. 1. In that position the long arm 28 or 29 of the linkage lies in a plane transverse to the mold axis so that its free end, carrying the pivot pin 32 or 35, moves approximately axially at the beginning of the stroke. Elastic deformability of the links and minor tolerances between the pivot pins and the surrounding bores contribute to the apparent standstill of stripper plate 24 relative to mold portion 21 at that phase.

Figure 9:
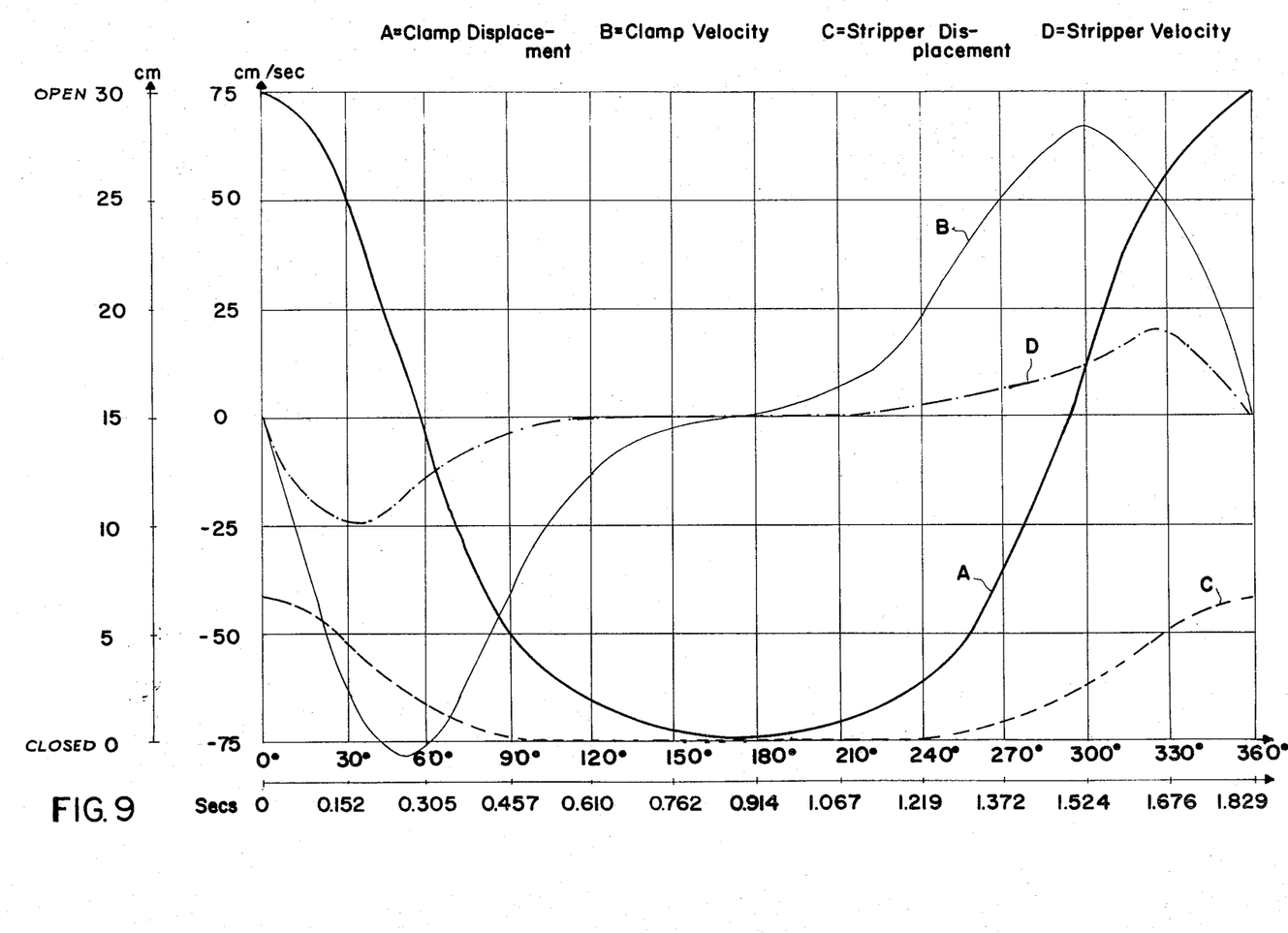
FIG. 9 is a curve diagram relating to the operation of the system of FIGS. 1 and 2.

Reference in this connection is made to FIG. 9 which shows several curves A, B, C and D relating to a system as shown in FIGS. 1 and 2. Solid curves A (heavy) and B (light) represent clamp displacement and clamp velocity, respectively, the term "clamp" denoting the movable assembly 12, 13, 21. The broken lines C (dashed) and D (dot-dashed) respectively indicate stripper displacement and stripper velocity, i.e., the law of motion of plate 24 relative to the clamp. These curves have been plotted for a full cycle of 360° of the crank driving the reciprocating ram 13 (cf. my prior U.S. Pat. No. 3,117,348); the abscissa also shows the time elapsed at different stages of the cycle (total period 1.829 sec) whereas the ordinate shows displacement in centimeters (ram stroke 30 cm) and velocity in cm/sec (range limits approximately ±75 cm/sec for the clamp and ±25 cm/sec for the stripper plate). From curves C and D it will be noted that stripper plate 24 remains substantially fixed, with reference to mold portion 21, for well over 30° at the beginning of an opening stroke and at the end of a closing stroke. The peaks of the curves, occurring in the region of about ±60° from the mold-open position, follow a substantially Gaussian law.

Figure 3:
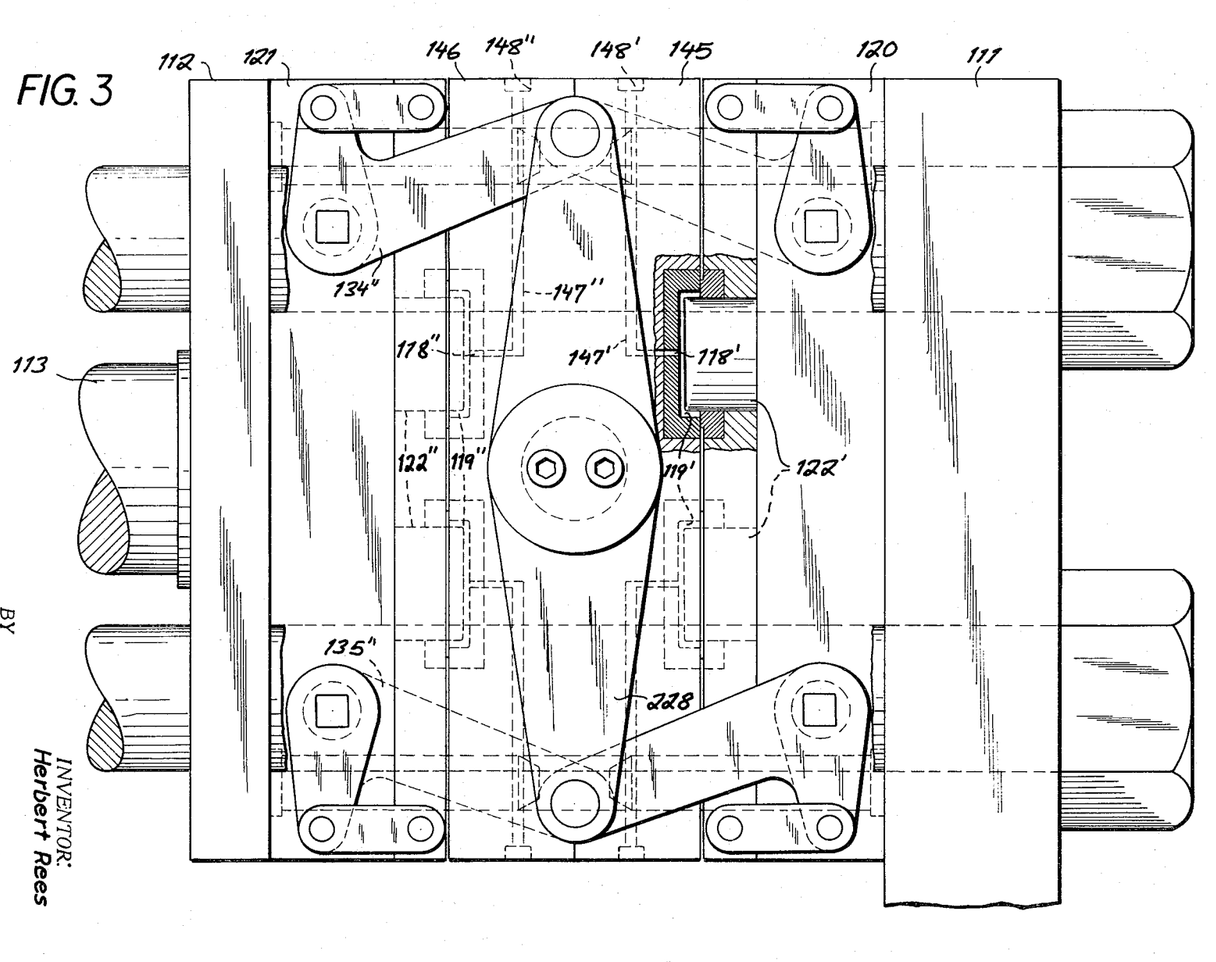
FIG. 3 is another side-elevational view like FIG. 1 but showing an alternate embodiment in the mold-closed position.
Figure 4:
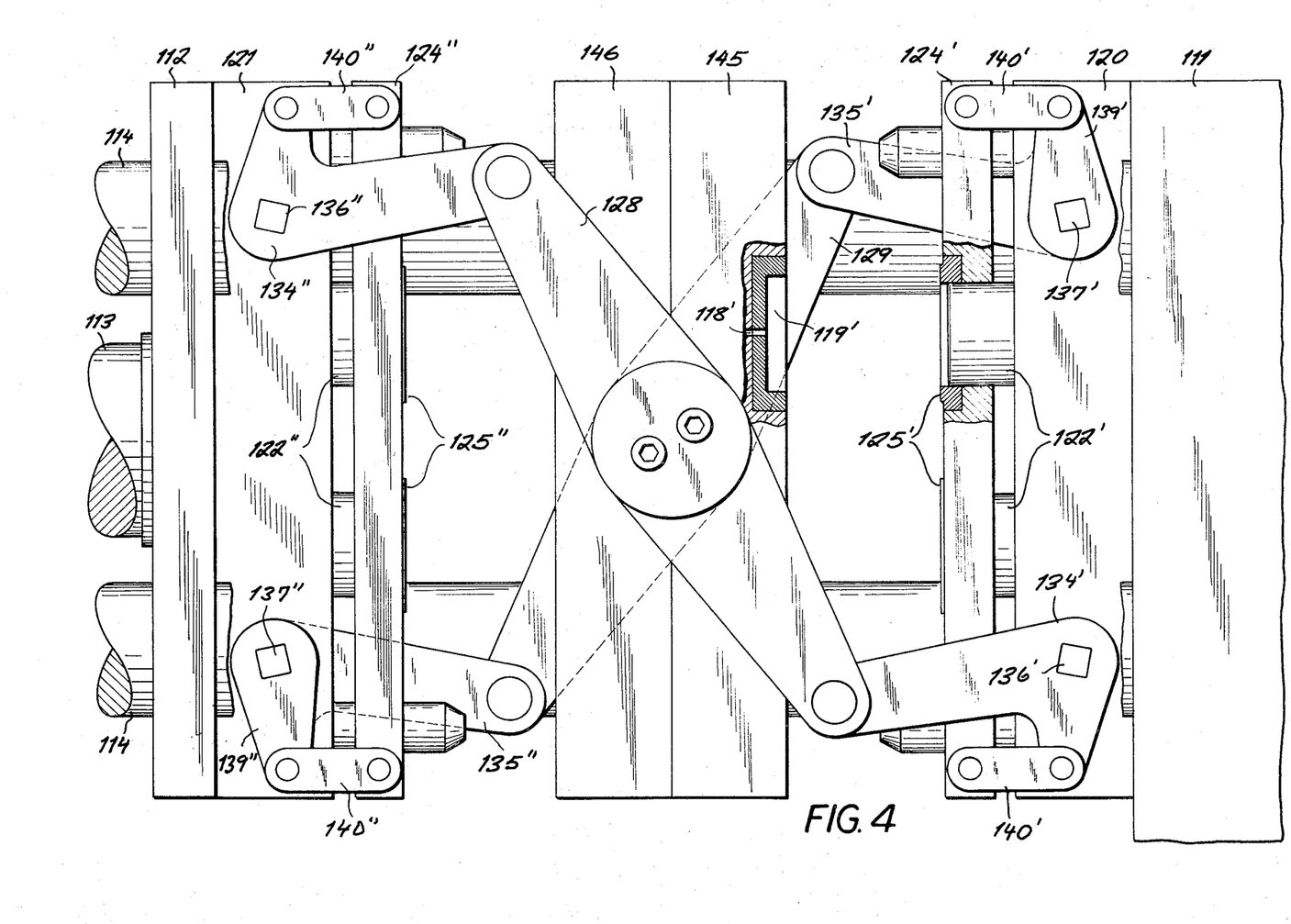
FIG. 4 is a view corresponding to that of FIG. 3 but with the mold open.

The system of FIGS. 3 and 4 utilizes the same principles as that of FIGS. 1 and 2 in an injection-molding machine in which two sets of mold cavities are formed between a stationary mold portion 120 on a fixed platen 111, a movable mold portion 121 on a reciprocable platen 112 coupled with a ram 113 and supported by tie bars 114, and an intermediate mold portion consisting of two halves 145, 146 floatingly disposed between mold portions 120 and 121. One set of cavities, defined by cylindrical recesses 119' in plate 145 and by associated cores 122' on plate 120, are shown to have orifices 118' at the bottom of the recesses for the injection of plastic material via channels 147' terminating at ports 148' to which the plastic material may be supplied from an external injection cylinder with the aid of nipples (not shown) moving radially into engagement with these ports, e.g., as described in my copending application Ser. No. 16,442 now U.S. Pat. No. 3,659,997 filed Mar. 4, 1970, when the parts are in the mold-closed position of FIG. 3. Corresponding elements of the other set of cavities have been designated 118'', 119'', 122'', 147'' and 148''. It will be understood that the various channels 147', 147'', 148', 148'' could also be connected to a common injection port on the mold portion 145, 146. Two stripper plates 124', 124'', respectively inserted between mold plates 120, 145 and 121, 146, carry rings 125', 125'' which surround the associated cores 122', 122'' to unload the molded particles (here having the form of shallow caps or lids) when the stipper plates move inwardly with reference to their supporting mold portions 120, 121 as illustrated in FIG. 4. The mechanism displacing the stripper plates 124', 124'' comprises two symmetrical linkages including elongate members 128, 129 both centrally fulcrumed on the intermediate mold portion 145, 146, bell-crank levers 134', 134'' articulated to opposite ends of member 128 and respectively pivoted on mold portions 120 and 121, similar bell-crank levers 135', 135'' connecting the members 128, 129 with these mold portions, arms (not shown) parallel to the short arms of levers 134', 134'' mounted on the pivotal axles 136', 136'' thereof at the far side of the mold, similar arms 139', 139'' on the shafts 137', 137'' of levers 135', 135'', and straps 140', 140'' linking these arms and levers with plates 124' and 124'', respectively. These linkages function in the same manner as in the preceding embodiment but have the additional task of coordinating the movement of intermediate mold portion 145, 146 with that of the ram-controlled outer mold portion 121, the latter traveling at twice the speed of the former.

Figure 5:
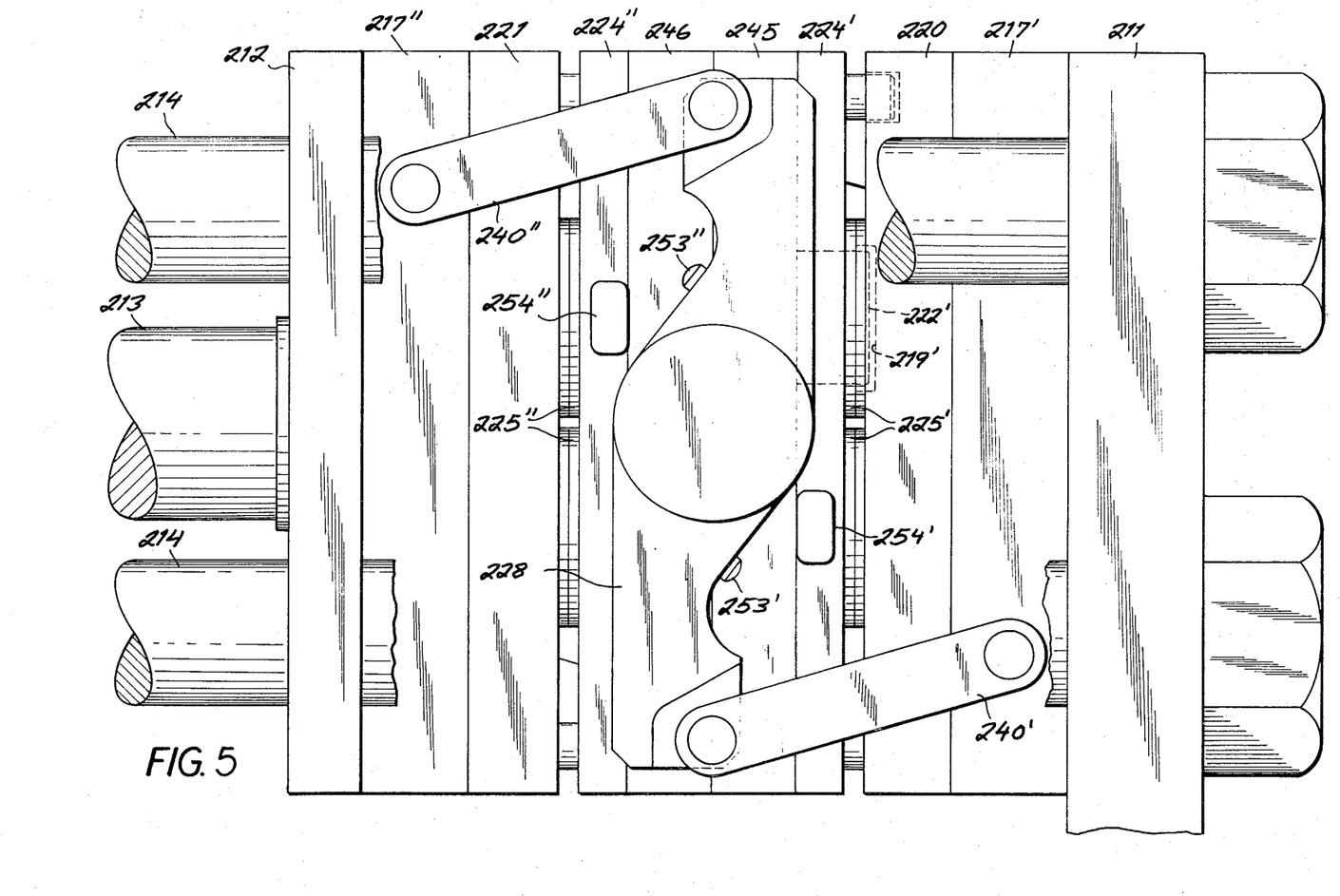
FIGS. 5 and 6 are two side-elevational views of a further embodiment, again in mold-closed and mold-open position, respectively.
Figure 6:
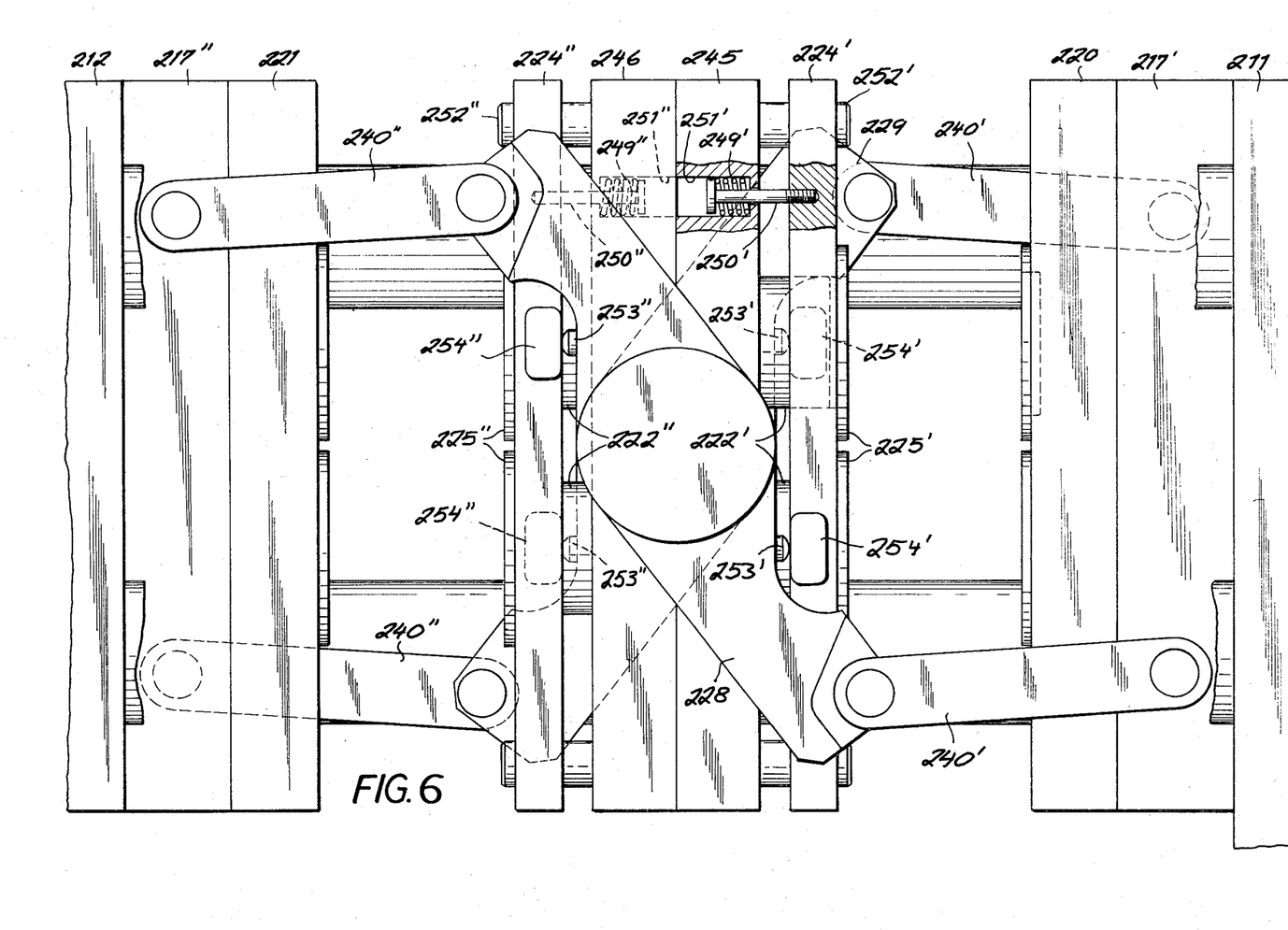

In FIGS. 5 and 6 the same basic mold structure has been used as in FIGS. 3 and 4, i.e., a stationary mold portion 220 on a fixed platen 211, a reciprocable mold portion 221 on a movable platen 212 which is guided by tie bars 214 and secured to a ram 213, and an intermediate mold portion formed from two symmetrical plates 245, 246.

Inserted between the two platens and the associated mold portions are two distributor plates 217', 217'' to which plastic material may be supplied, in the closed-mold position of FIG. 5, via external nipples as described above. Two sets of mold cavities are formed by cores 222', 222'' on inner plates 245, 246 received in respective recesses of plates 220 and 221, one such recess having been illustrated at 219'.

In this instance the two stripper plates 224' and 224", provided with unloading rings 225', 225" for the two sets of mold cavities, are supported by the intermediate mold portion 245, 246 toward which they are urged by coil springs 249', 249" bearing upon the heads of respective bolts 250', 250" received in bores 251', 251" of the two halves of this mold portion; they are further guided on pins 252', 252" which project from plates 245, 246 toward the mold portions 220, 221 and are receivable in recesses thereof (not shown) when the mold is closed as illustrated in FIG. 5.

The stripper mechanism of this embodiment comprises two links with centrally pivoted elongate members 228, 229 and arms 240', 240" directly articulated to the free ends of these members, these arms in their turn being pivoted to the distributor plates 217' and 217" constituting extensions of mold portions 220 and 221. Each central link member 228, 229 carries, at diametrically opposite intermediate locations, a pair of studs 253', 253" aligned with lateral lugs 254' on stripper plate 224' and 254" on stripper plate 224". Thus, as the mold opens and the long links 228, 229 swing toward the position shown in FIG. 6, the studs 253' and 253" engage the confronting lugs 254' and 254" to drive the two stripper plates 224', 224" outwardly against the loading force of their biasing springs 249', 249". It will be appreciated that the system would also operate without these springs, inasmuch as the return of the mold to its closed position (FIG. 5) necessarily forces the stripper plates back onto mold portion 245, 246, yet the presence of the springs insures a more gradual and therefore quieter restoration of the stripper plates which recede with the swing of the links 228, 229 instead of being subjected to the impact of plates 220, 221.

Figure 7:
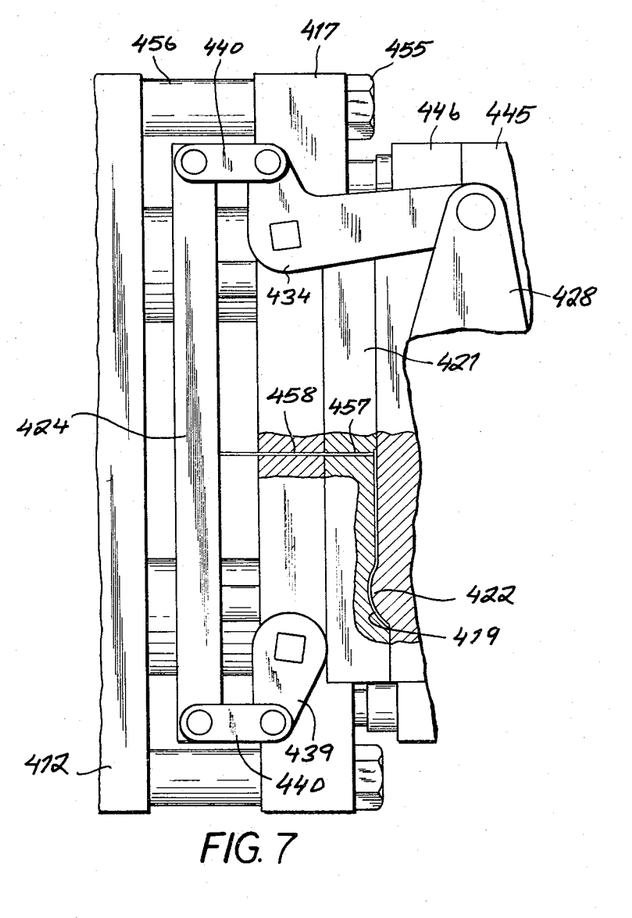
FIGS. 7 and 8 show parts of a modified unloading mechanism, in side elevation and partly in section, in the positions of mold closure and mold opening, respectively.
Figure 8:
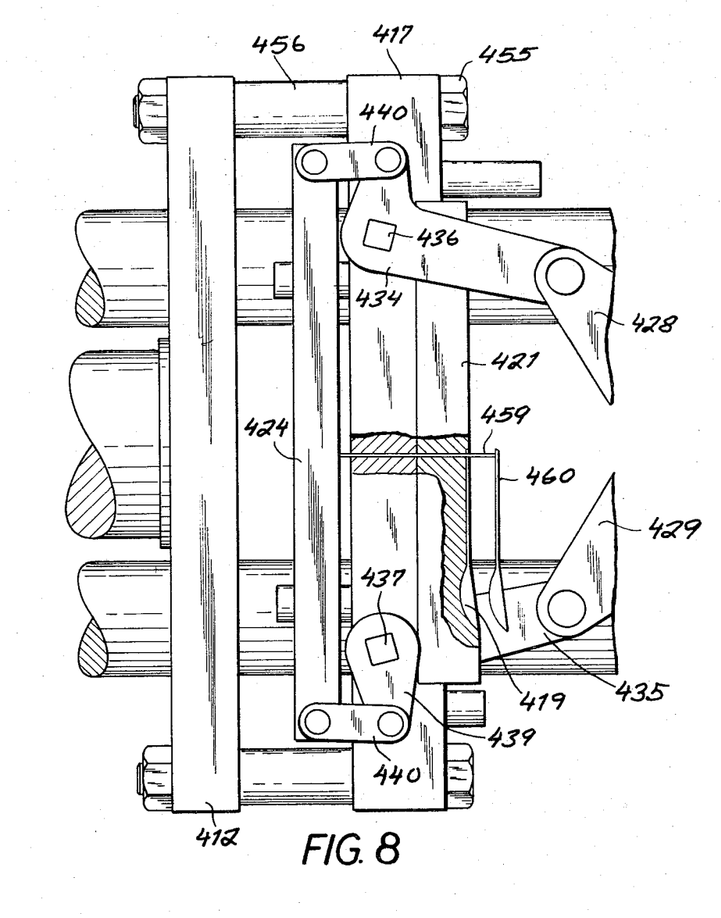

Whereas the unloading of the molded articles in the systems of FIGS. 1 - 6 is carried out with the aid of stripper plates interposed between the relatively movable mold portions defining one or more cavities, the same basic principles may be utilized with a mold including an ejector plate carried at the outer surface of one of the mold portions. This has been illustrated in FIGS. 7 and 8 where a movable platen 412 is spacedly secured, via bolts 455 and sleeves 456, to a distributor plate 417 supporting a mold portion 421 with a set of recesses 419 (only one shown) which form cavities with complementary projections 422 on an intermediate mold portion consisting again of two halves 445, 446. Each mold cavity, to which plastic material is admitted in the aforedescribed manner via a nonillustrated channel system in distributor plate 417, opens toward a pair of aligned bores 457, 458 in plates 421 and 417, these bores being traversed by a thrust pin 459 rigid with an ejector plate 424 which is received in the clearance between platen 412 and plate 417. Ejector plate 424 is supported on plate 417 by a pair of linkages similar to those of FIGS. 3 and 4, including elbows or bell-crank levers 434, 435 articulated to a pair of elongate members 428, 429 which are centrally fulcrumed on opposite sides of mold portion 445, 446. As before, the square-ended shafts 436, 437 or these levers are provided on their opposite ends with arms that are coextensive with the short arms of the levers, one of them being visible at 439. Straps 440 link the elbows and the arms to the plate 424 whereby the latter executes a harmonic motion, similar to that represented by curves C and D in FIG. 9, toward plate 417 upon relative displacement of the mold portions from their closed position (FIG. 7) to their open position FIG. 8). Ejector pin 459 is thus advanced into the mold cavity to dislodge a freshly formed article 460 (here a spoon) therefrom as the mold opens. The system is duplicated at the stationary mold portion which has not been illustrated in FIGS. 7 and 8.

Following are some of the advantages inherent in the harmonic motion which is imparted to a stripper or ejector plate by my improved unloading system:

a. In the initial position, in which the large link such as member 28 and the short arm of the associated bell-crank lever are substantially perpendicular to the direction of plate motion, a large force is available to dislodge the molded articles from their cavities; once the articles have been loosened, only a minor force is required to complete their ejection.

b. Even with high-speed mold movement the displacement of the stripper or ejector plate is relatively slow and gentle, free from objectionable impact and noise.

c. The positive coupling of the unloader with the movable mold portion insures perfect synchronization which is not always the case with separately controlled penumatic or hydraulic ejector systems.

Naturally, the lost-motion coupling described in conjunction with FIGS. 1 and 2 may also be used in any of the subsequent embodiments, e.g., by constructing the long arms 128 etc. thereof as extensible members consisting of telescoped parts similar to those shown in FIG. 2.

I claim:

1. In an injection-molding machine, in combination, a first mold portion and a second mold portion together defining at least one mold cavity, said mold portions being relatively displaceable between an open-mold position and a closed-mold position; unloading means on said first mold portion movable with reference thereto for dislodging an article molded in said cavity; and an articulated linkage with several pivotally interconnected parts joined to both said mold portions for actuation of said unloading means, in response to a displacement of said mold portions into said open-mold position, by advancing said unloading means from a retracted position into an operative position at a reduced rate with reference to the relative displacement of said mold portions.

2. The combination defined in claim 1 wherein said unloading means comprises a plate perpendicular to the direction of mold displacement, said linkage being duplicated on opposite sides of said mold portions with engagement of said plate at diametrically opposite locations.

3. The combination defined in claim 2 wherein each linkage comprieses an elongate member pivoted to one of said mold portions and a shorter swingable element fulcrumed on the other of said mold portions and pivotally joined to said member, the latter extending generally parallel to said plate in said closed-mold position.

4. The combination defined in claim 3 wherein said element is a bell-crank lever on said first mold portion with one arm linked to said member, another arm rigid with said one arm and a pivoted extension of said other arm linked to said plate.

5. The combination defined in claim 4 wherein said first mold portion is provided with two throughgoing transverse shafts each having one end secured to the bell-crank lever of a respective linkage and being provided at its opposite end with a further arm parallel and coextensive with said other arm, said further arm also having a pivoted extension linked to said plate.

6. The combination defined in claim 4 wherein the length of said member substantially exceeds that of either of said arms.

7. The combination defined in claim 4 wherein said plate is disposed between said mold portions and is provided with an annular formation traversed by a cavity-defining projection on said first mold portion in said closed-mold position.

8. The combination defined in claim 4 wherein said plate is disposed on the side of said first mold portion remote from said second mold portion and is provided with an ejector pin traversing said first mold portion and terminating at said cavity.

9. The combination defined in claim 3 wherein said member is pivoted to said first mold portion and is provided at an intermediate point with cam means positioned to bear upon said plate upon partial separation of said mold portions.

10. The combination defined in claim 9 wherein said first mold portion is provided with resilient means yieldably urging said plate into contact with said first mold portion.

11. The combination defined in claim 3, further comprising a third mold portion defining with one of the other mold portions at least one further mold cavity, said member being pivoted to the middle one of said mold portions and being linked through respective swingable elements with the two outer mold portions, said plate being duplicated on opposite sides of the middle mold portion.

12. The combination defined in claim 3 wherein each linkage includes a lost-motion coupling for enabling said member to pivot without entrainment of said swingable element in a terminal phase of mold closure.

13. The combination defined in claim 12 wherein said lost-motion coupling includes a pair of telescoped parts and spring means tending to maintain said parts relatively extended.

* * * * *